May 9, 1950  H. SALISBURY  2,506,813
LIGHT FILTER
Filed Aug. 21, 1946

INVENTOR.
Harold Salisbury
BY Thomas A. Jenckes
Attorney

Patented May 9, 1950

2,506,813

UNITED STATES PATENT OFFICE 2,506,813

LIGHT FILTER

Harold Salisbury, Esmond, R. I., assignor of one-half to Edward Welch, Valley Falls, R. I.

Application August 21, 1946, Serial No. 692,018

1 Claim. (Cl. 88—106)

My invention relates to improvements in light filters for use in photography, telescopic viewing and other optical purposes.

In the prior art light filters have been made in various manners. They have usually comprised a dyed transparent gelatin film which can be dyed to various shades and it has been generally thought in the trade that while harder to use, they are more accurate in their delicate filtering action than glass filters. Various types of glass filters have also been used in the trade, but these have been brittle, break and chip easily and they must be pigmented. It has been extremely difficult to uniformly incorporate the pigment in glass in a suitable manner to make a really satisfactory filter.

A third group consists of a dyed gelatin film affixed to a piece of glass, which really has the disadvantages of both.

I have provided a novel type of light filter which I believe is superior to all other types and for this purpose I make a thin disk of standard thickness for light filters of a transparent acrylic acid synthetic resin, preferably poly methyl methacrylate synthetic resin which may be suitably colored to the desired shade. This particular type of resin may have pigment more uniformly incorporated therein than glass, so that the pigment will not affect its light transmitting properties. It also may be uniformly dyed directly without the use of pigment even after it is made up in slabs and hence may be made into a greater variety of filtering shades than is possible with glass filters.

A further object of my invention is to provide a filter which will not interfere with the light transmitted to the photographic or telescopic lens. A colored poly methyl methacrylate disk transmits 91–92% of the light which passes through it, even greater than the amount of light transmitted by the photographic or telescopic lens. Employing my improved filter I have, therefore, attained sharper pictures and more accurate filtering effects than is possible with other types of filters. In addition, I have discovered that these filters are of great tensile strength, do not chip, are shatter-proof and very hard to break. I have also discovered that while my improved filter may be scratched that such scratching does not appreciably affect the light transmitting or filtering properties.

I have also discovered that if my improved filter be scratched and laid adjacent another plate of poly methyl methacrylate when slightly heated under pressure at even a great amount less than the plasticizing temperature thereof, that in a while such scratch will entirely disappear, thus making it possible to readily repair scratched filters, a feature not possible in glass or gelatin filters.

I have also discovered that such a filter may have its outer edge ground dry and that such filters so constructed have the property of making this edge readily visible and substantially opaque and that after grinding dry, they are covered with an opaque film of dry grinding detritus comprising minute particles of the filter material substantially inhibiting all passage of light through the edge wall thereof, which latter feature can be readily tested by looking at the disk from either side while grasping it between two fingers when the fingers appear so close together that it does not appear that there is a filter between them at all.

It is also obvious that when the edge of the filter is ground dry to provide such a film it entirely eliminates the necessity for any additional means for opaquing the edges of the filter or providing a lens holder for this purpose, and I have further discovered that if said rim edge be rearwardly tapered the filter can be made of a size to fit directly in a lens or telescopic barrel without the necessity of any lens holder.

These and such other objects of my invention as may hereinafter appear will be best understood from a description of the accompanying drawings which illustrate an embodiment thereof.

In the drawings, Fig. 1 is a front elevation of a light filter constructed in accordance with my invention.

Fig. 2 is an edge or side elevation thereof.

Fig. 3 illustrates the step of dry grinding the rim edge of my improved filter preferably with the wall thereof tapering rearwardly or inwardly by holding said filter with the edge thereof inclined relative to the grinding surface of the grinding wheel shown to provide a rearwardly tapered outer rim edge covered with an opaque film of dry grinding detritus substantially inhibiting all passage of light through the edge wall thereof.

Figure 1:
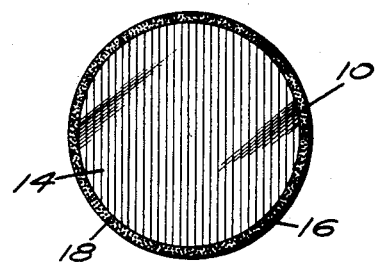

In the drawings, wherein like characters of reference generally indicate like parts throughout, 10 generally indicates a light filter constructed in accordance with my invention, comprising a thin disk of transparent acrylic acid synthetic resin colored to the desired shade in the embodiment shown and preferably being constructed of poly methyl methacrylate, known in the trade under various trade names, such as "Plexiglas" and "Lucite." The disk is of about the standard depth of glass filters, varying from 3 to 13 mm. or ⅛ to ¼ inch. As stated hitherto, the entire disk or filter may be colored in any desirable fashion such as red as shown. Such disks may readily have pigment more uniformly incorporated therein than glass so as not to have the pigment interfere with the light transmitting property or filtering properties of the filter. In addition acrylic acid resins may be readily dyed even after made up in slabs to any desired tint, making a wider range of shade of light filters possible than is possible in glass filters, and providing a filter which has the advantages of the spread of colors of gelatin and the advantages of having a solid member such as a glass filter, but which has greater light transmitting properties than either a glass or a gelatin filter, so as to be more sensitive in use. Any shade filter may be produced, depending upon the purpose desired and any type of a light filter may be provided, whether it be desired to bring out certain features of a certain product to provide striking contrasts, to damp out a certain color in the picture, to provide a filter of any standard yellow, green, red, blue, orange, etc., color or the desired selective shades or tints thereof.

As shown, my improved filter has the flat front edge 12 and the flat rear edge 14 and the usual outer rim edge 16. The rough die is first cut from the slab and I have discovered that if the outer rim edge be ground dry it will be covered with a film 18 of dry grinding detritus comprising minute particles of the filter material which remains covering the rim edge in use and that this opaque film inhibits all passage of light through the edgewall thereof, so as to prevent any light from coming in through said edge wall to interfere with the passage of light passing axially through the filter in use or in any way blurring the light transmission of the rays so passed.

Figure 5:
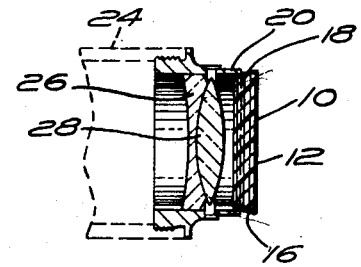
Fig. 5 is a horizontal sectional view taken along the line 5—5 of Fig. 4 through the end of a camera lens holder having my filter attached.
Figure 4:
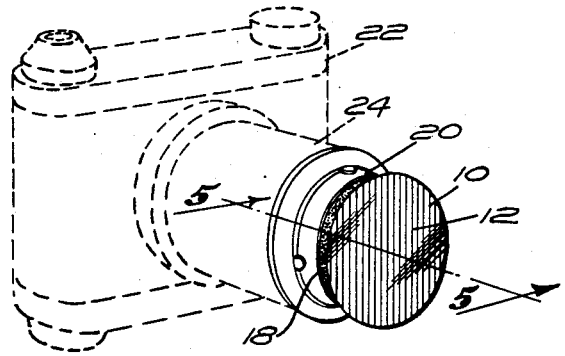
Fig. 4 is a perspective view illustrating my improved light filter having its rim edge mounted within the outer end of the lens barrel of a suitable camera.

I have also discovered that due to the presence of this film, the necessity of any lens holder or rim to inhibit the penetration of light through the rim or edge may be dispensed with and that my improved light filter can be used without any lens holder by tilting the outer rim edge 16 rearwardly with a rearward taper as shown so that it may fit into a lens or telescope barrel 20 as shown in Figs. 4 and 5 on a camera 22, having the barrel 24 projecting therefrom, having the usual lenses 26 and 28 therein interior of the end of the barrel. Just as I have shown my invention 10 mounted within the barrel of the camera, it may be similarly mounted within the barrel of a telescope or other optical instrument.

Figure 3:
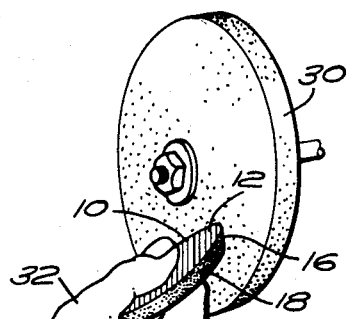
Figure 2:
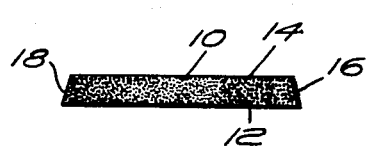

I have illustrated in Fig. 3 how the rim edge 16 may be ground dry by contact with the rotating abrasive surface such as the side wall of the grinding wheel 30 shown and how the filter 10 may be readily grasped between the thumb and forefinger of a hand 32 for this purpose and held at the desired tilt against the surface of the rotating wheel to provide the rearwardly tapered edge 16 covered with the opaque film 18 of dry grinding detritus.

It is apparent, therefore, as stated, that my improved filter is ground in a manner not to interfere with the transmission of light therethrough and may be provided with a greater plurality of shades than other filters, that it has greater light transmitting properties than other filters, that it positively inhibits the passage of any light through the edge thereof to otherwise interfere with its functioning, that it is hard to break, substantially shatter-proof and may be readily mounted on a lens barrel without a special lens holder. The light filter may be used just as other light filters with the better results explained aforesaid.

It is apparent, therefore, that I have provided a novel type of light filter with the advantages explained above.

It is understood that my invention is not limited to the specific embodiment shown and that various deviations may be made therefrom without departing from the spirit and scope of the appended claim.

What I claim is:

A light filter for use in photography, telescopic viewing and other optical purposes, comprising a thin disk of a transparent acrylic acid synthetic resin colored to the desired shade and having a ground outer rim edge rearwardly tapered to fit directly into a lens or telescope barrel and covered with an opaque film of dry grinding detritus comprising minute particles of the filter material substantially inhibiting all passage of light through the edge wall thereof.

HAROLD SALISBURY.

REFERENCES CITED

The following references are of record in the file of this patent:

UNITED STATES PATENTS

| Number | Name | Date |
|---|---|---|
| 970,111 | Ramstein-Gschwind | Sept. 13, 1910 |
| 1,507,327 | Wrighton | Sept. 2, 1924 |
| 2,182,585 | Green | Dec. 5, 1939 |
| 2,186,143 | Neugass | Jan. 9, 1940 |
| 2,193,035 | Matthews et al. | Mar. 12, 1940 |
| 2,197,184 | Kemp | Apr. 6, 1940 |
| 2,367,111 | Fowler et al. | Jan. 9, 1945 |
| 2,420,270 | Thomas | May 6, 1947 |

OTHER REFERENCES

"Plexiglas" Manual, 9th edition, Rohm and Haas Co., Philadelphia, Pennsylvania.

Frederick, Article in Modern Plastics, October 1936, entitled "Acrylic Resins."